United States Patent
Chattopadhyay et al.

(10) Patent No.: US 7,745,566 B2
(45) Date of Patent: Jun. 29, 2010

(54) METHODS FOR THE PURIFICATION OF POLYMERS

(75) Inventors: Pratibhash Chattopadhyay, North Royalton, OH (US); Boris Y. Shekunov, Aurora, OH (US); K. Adam Gibson, Fairlawn, OH (US)

(73) Assignee: Ferro Corporation, Cleveland, OH (US)

( * ) Notice: Subject to any disclaimer, the term of this patent is extended or adjusted under 35 U.S.C. 154(b) by 19 days.

(21) Appl. No.: 12/017,399

(22) Filed: Jan. 22, 2008

(65) Prior Publication Data

US 2008/0269449 A1    Oct. 30, 2008

Related U.S. Application Data

(60) Provisional application No. 60/886,162, filed on Jan. 23, 2007.

(51) Int. Cl.
*C08F 6/00* (2006.01)
*C08G 65/46* (2006.01)

(52) U.S. Cl. .................. 528/491; 526/329.7; 528/361; 528/421

(58) Field of Classification Search .............. 526/329.7; 528/361, 421
See application file for complete search history.

(56) References Cited

U.S. PATENT DOCUMENTS

| 5,639,441 | A | | 6/1997 | Sievers et al. |
| 5,679,737 | A | * | 10/1997 | DeSimone et al. ......... 524/529 |
| 5,739,270 | A | * | 4/1998 | Farmer et al. ............. 528/501 |
| 5,851,453 | A | | 12/1998 | Hanna et al. |
| 5,981,474 | A | | 11/1999 | Manning et al. |
| 6,095,134 | A | | 8/2000 | Sievers et al. |
| 6,372,260 | B1 | | 4/2002 | Andersson et al. |
| 6,669,960 | B2 | | 12/2003 | Etter |
| 6,858,199 | B1 | | 2/2005 | Edwards et al. |
| 6,966,990 | B2 | | 11/2005 | Chattopadhyay et al. |
| 6,998,051 | B2 | | 2/2006 | Chattopadhyay et al. |
| 7,279,181 | B2 | | 10/2007 | Chattopadhyay et al. |
| 7,291,270 | B2 | * | 11/2007 | Gibson et al. ............. 210/650 |

OTHER PUBLICATIONS

Corresponding U.S. Appl. No. 12/017,414, filed Jan. 22, 2008, Entitled Supercritical Fluid Extraction Produced by In-Line Homogenization, P. Chattopadhyay et al. (Not yet published).

* cited by examiner

*Primary Examiner*—Terressa M Boykin
(74) *Attorney, Agent, or Firm*—Rankin, Hill & Clark LLP

(57) ABSTRACT

The present invention provides methods for purifying polymers. In each embodiment of the invention disclosed herein, a supercritical fluid is contacted with an organic solution that includes a polymer to be purified dissolved in an organic solvent. The supercritical fluid extracts the organic solvent from the organic solution. Impurities such as residual monomers and process solvents are removed with the organic solvent and supercritical fluid, thereby purifying the polymer. The methods of the invention are particularly suitable for use in the purification of biodegradable polymers for use in pharmaceutical applications.

17 Claims, 4 Drawing Sheets

METHODS FOR THE PURIFICATION OF POLYMERS

BACKGROUND OF INVENTION

1. Field of Invention

The present invention relates to methods for the purification of polymers. More particularly, the present invention relates to methods that utilize supercritical fluid to purify polymers.

2. Description of Related Art

Polymers often include residual solvents, un-reacted monomers, and other impurities subsequent to their manufacture. The presence of such impurities can be problematic in certain applications such as, for example, in the manufacture of pharmaceuticals and other ingested materials.

A variety of methods exist for the purification of polymers. Many of such methods require the use of large quantities of organic solvents. While organic solvents can remove residual monomers and other impurities, they can themselves become contaminants that must also be removed.

In recent years, researchers have experimented with the use of supercritical fluid to extract impurities from polymers. For example, at least one process utilized the ability of supercritical fluid to plasticize some polymers, thereby forming a melt that could be mixed with the supercritical fluid to extract impurities. One drawback of this process was that it required the polymer to plasticize significantly in the presence of supercritical fluid. Many polymers, including many biodegradable polymers, do not plasticize sufficiently to make known supercritical fluid purification techniques viable. In addition, mixing the plasticized polymer with the supercritical fluid is a mechanically intensive process requiring specialized equipment.

BRIEF SUMMARY OF THE INVENTION

The present invention provides methods for the purification of polymers that overcome the limitations of prior art polymer purification methods. The methods of the present invention can be used with any polymer, regardless of the degree to which the polymer can be plasticized by supercritical fluid.

In a first embodiment of the invention, the method comprises dissolving a polymer containing impurities in an organic solvent to form an organic polymer solution; co-introducing the organic polymer solution and an aqueous solution into a homogenization device to form an emulsion, the emulsion having a discontinuous phase comprising the organic polymer solution and a continuous phase comprising the aqueous solution; contacting the emulsion with an extraction fluid in an extraction column while the extraction fluid is maintained in a supercritical state to extract the organic solvent and impurities from the discontinuous phase and thereby precipitate purified substantially spherical solid polymer particles into the aqueous continuous phase to form an aqueous suspension of substantially spherical solid polymer particles; and separating the aqueous suspension of purified substantially spherical solid polymer particles from the extraction fluid, organic solvent and impurities. In alternative embodiments of the invention, the polymer containing impurities is dissolved in an organic solvent to form an organic solution, which is contacted with an anti-solvent in an extraction vessel under conditions sufficient to maintain the anti-solvent in a supercritical state. The anti-solvent extracts the organic solvent and impurities from the organic solution, resulting in the precipitation of solid polymer particles or the formation of a supercritical anti-solvent plasticized polymer melt. In both instances, the polymer is purified and separated from the organic solvent and impurities.

The methods of the present invention do not require mechanical mixing. Mixing, while optional, improves mass transfer. But since the melt is formed after the impurities are removed, the plasticized polymer melt does not need to be mixed. The supercritical fluid can be agitated, which requires much less mechanical intensity and no specialized equipment.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
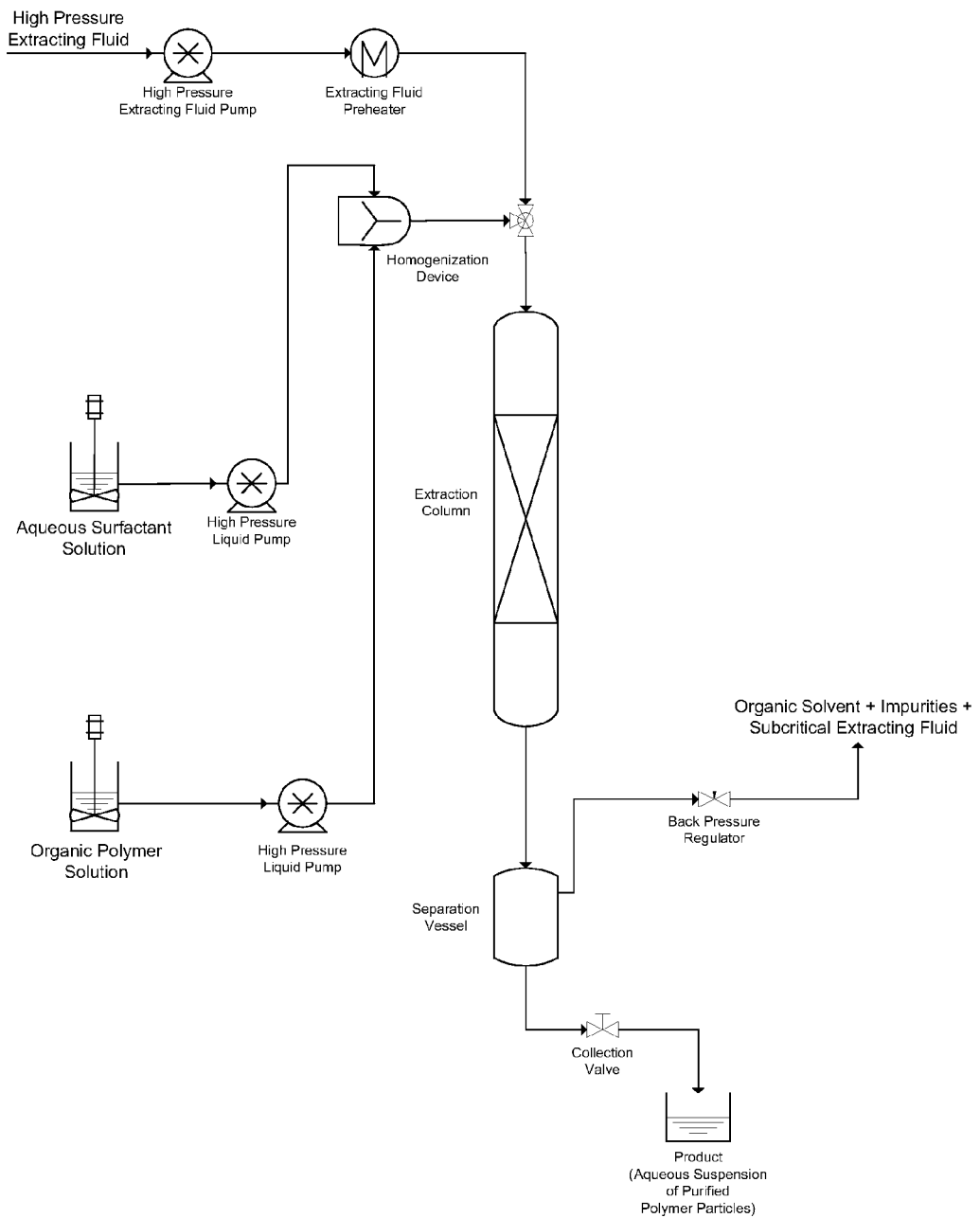
FIG. 1 is a schematic process flow diagram for a first embodiment of a method of the invention.

FIG. 1 is a schematic process flow diagram for a first embodiment of a method of the invention. In the first embodiment of the invention, a polymer to be purified is dissolved in an organic solvent (e.g. dichloromethane) to form an organic polymer solution. Separately, one or more stabilizers, surfactants, and/or excipients is dissolved in water to form an aqueous solution. The organic polymer solution and the aqueous solution are co-introduced into a homogenization device by means of high-pressure liquid pumps. In the homogenization device, the organic polymer solution becomes an internal (or discontinuous) phase of an emulsion, and the aqueous solution becomes an external (or continuous) phase of the emulsion. The concentration of the stabilizer(s)/surfactant(s) can be adjusted to yield the desired emulsion droplet size, which corresponds to the final particle size of the purified polymer after processing.

The homogenization device is typically a static mixing element or multiple static mixing elements in series. Alternatively, the homogenization device could consist of a tank with a high shear mixer, or other high-pressure homogenization apparatus. The rate of introduction of the organic solution and the aqueous solution determines their relative proportions in the final emulsion.

An extracting fluid is converted to a supercritical state by means of a specialized high-pressure pump and heat exchanger that controls pressure and temperature, respectively. The extracting fluid is preferably supercritical carbon dioxide ("SC $CO_2$").

The emulsion effluent from the homogenization device is mixed with the supercritical extracting fluid and introduced into an extraction column through a nozzle. The nozzle, together with the high pressure extracting fluid, serves to disperse the homogenized emulsion to facilitate efficient extraction. The extraction column is temperature-controlled such that the extracting fluid may be maintained in its supercritical state.

In the extraction column, the organic solvent in the organic solution forming the internal phase of the emulsion, and any impurities that were in the dissolved polymer (e.g., residual solvents, un-reacted monomers, and other impurities) when the emulsion was formed, are extracted into the supercritical fluid. The external aqueous phase of the emulsion is not extracted by the SC $CO_2$. Thus, the extraction of the organic solvent from the organic solution by the SC $CO_2$ causes the dissolved polymer in the organic solution to precipitate into the aqueous continuous phase of the emulsion in the form of purified substantially spherical solid polymer particles and thereby form an aqueous suspension of substantially spherical solid polymer particles.

The aqueous suspension of purified polymer particles and the impurity-laden organic solvent and SC $CO_2$ mixture exit the extraction column and flow into a separation vessel. The impurity-laden organic solvent and SC $CO_2$ mixture exits through the top of the separation vessel. The aqueous suspension of purified polymer particles settles to the bottom of the separation vessel via gravity, where it is removed through a collection valve. The collection valve serves to regulate the flow of the aqueous suspension of polymer particles, thereby maintaining the desired level of liquid in the vessel and preventing system depressurization.

The effluent from the extraction column enters the separation vessel through a tube that protrudes into the separation vessel (i.e., a dip tube). This minimizes loss of product suspension through the SC $CO_2$ outlet by providing physical separation between the inflow of effluent and the outflow of impurity laden organic solvent and SC $CO_2$ mixture. The system pressure is controlled by means of a backpressure regulator on the impurity laden organic solvent and SC $CO_2$ mixture vent line. It will be appreciated that the organic solvent and the SC $CO_2$ in the impurity laden organic solvent and SC $CO_2$ mixture can be separated and recovered for reuse.

It will be appreciated that polymer particles are formed as the polymer is purified. Three steps, namely solvent removal, impurity removal, and particle formation, are advantageously combined into one continuous process.

There is no limitation on the type of polymers can be purified in accordance with the process of the invention. Polymers that do not readily form plasticized melts with supercritical fluid can be processed in accordance with the method of the invention. Polymers of particular usefulness in the pharmaceutical field that can be purified in accordance with the invention include poly(lactic-co-glycolic) acid, polylactic acid, polyethylene glycol, Eudragit polymers, PMMA polymers, ethylcellulose, and combinations of these polymers.

It will further be appreciated that virtually any organic solvent that is soluble in SC $CO_2$ and that dissolves the polymer in question could be used. Preferred organic solvents include any of the halogenated hydrocarbons (e.g., chloroform, dichloromethane, etc.), ketones (e.g., acetone, methyl ethyl ketone, etc.), alcohols, or ethyl acetate. The presently most preferred organic solvents are dichloromethane and acetone.

The use of a surfactant in the external aqueous phase is optional. Any surfactant that dissolves in water and sufficiently stabilizes the emulsion is acceptable. Preferred surfactants include polyvinyl alcohol, polysorbate, sodium dodecyl sulfate, Vitamin E (d-alpha-tocopheryl) polyethylene glycol 1000 succinate, and Tyloxapol. The presently most preferred surfactants for use in the invention are polyvinyl alcohol and polysorbate.

The extraction fluid is preferably SC $CO_2$, but other supercritical fluids such as, for example, supercritical ethane, supercritical ethylene, supercritical propane, supercritical propylene, supercritical pentane, and the like could be used, if desired.

Figure 2:
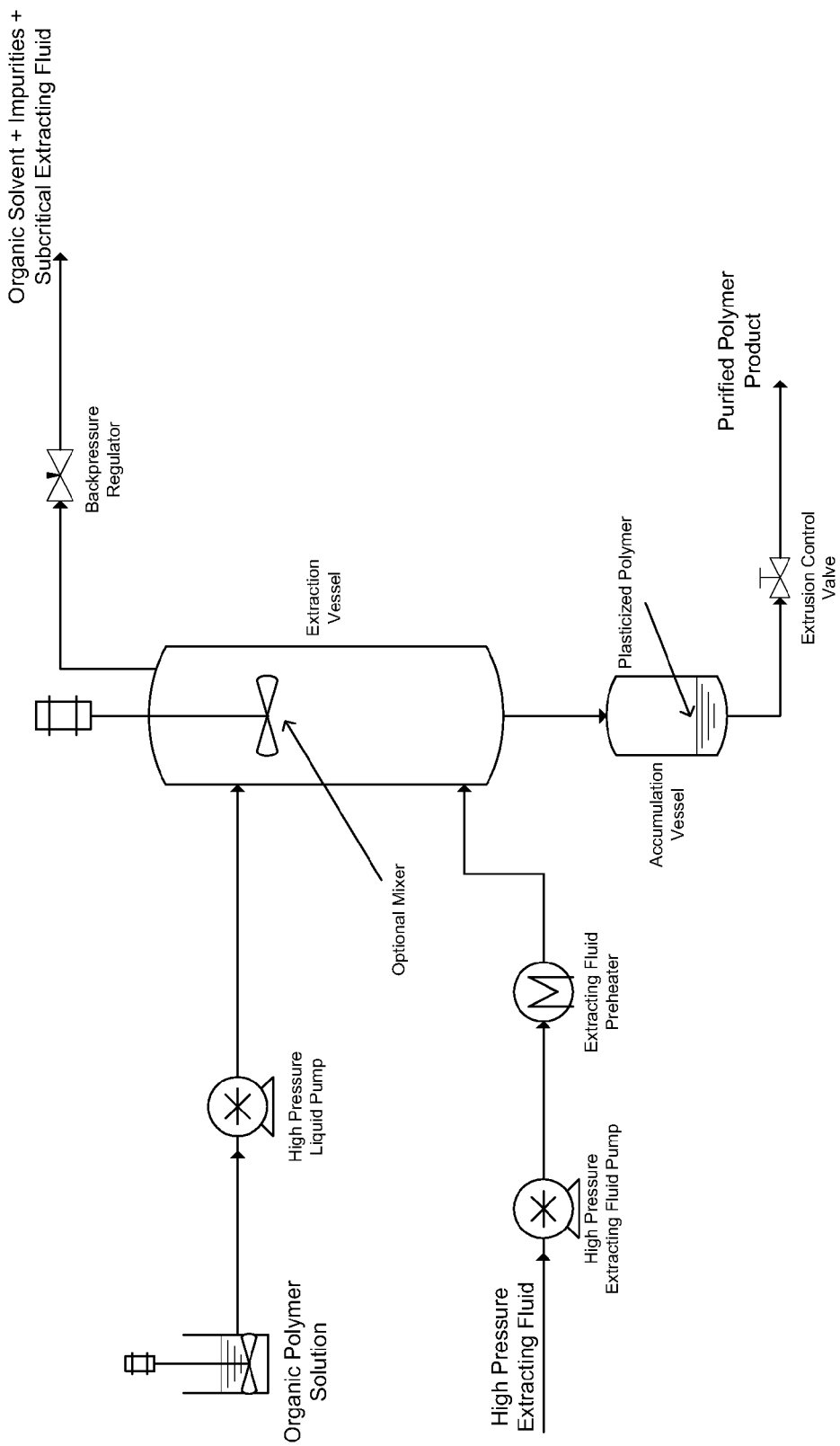
FIG. 2 is a schematic process flow diagram for a second embodiment of a method of the invention.

FIG. 2 is a schematic process flow diagram for a second embodiment of a method of the invention. In the second embodiment of the invention, a polymer is dissolved in an organic solvent such as acetone. An anti-solvent is converted to a supercritical state by means of a specialized high-pressure pump and heat exchanger that controls pressure and temperature, respectively. The anti-solvent is preferably SC $CO_2$.

The organic polymer solution and supercritical anti-solvent are introduced into an extraction vessel simultaneously, but separately, by means of high-pressure pumps. The extracting vessel is temperature-controlled such that the anti-solvent is maintained in its supercritical state. Static mixing elements can, but need not be employed in this co-current flow configuration.

The organic solvent and any impurities in the organic polymer solution (e.g., residual solvents, un-reacted monomers, and other impurities) dissolve in the supercritical anti-solvent, causing the dissolved polymer to precipitate. Depending on the nature of the polymer, the polymer either forms solid particles or becomes a plasticized melt. In the case a plasticized polymer melt is formed, an accumulation vessel is connected to the bottom of the extraction vessel as shown in FIG. 2. The plasticized polymer flows into the accumulation vessel. It is extruded from the bottom of the accumulation vessel in a continuous manner. An extrusion valve controls the rate of this extrusion. The anti-solvent and impurities exit from the top of the extraction vessel through a backpressure regulator.

Figure 3:
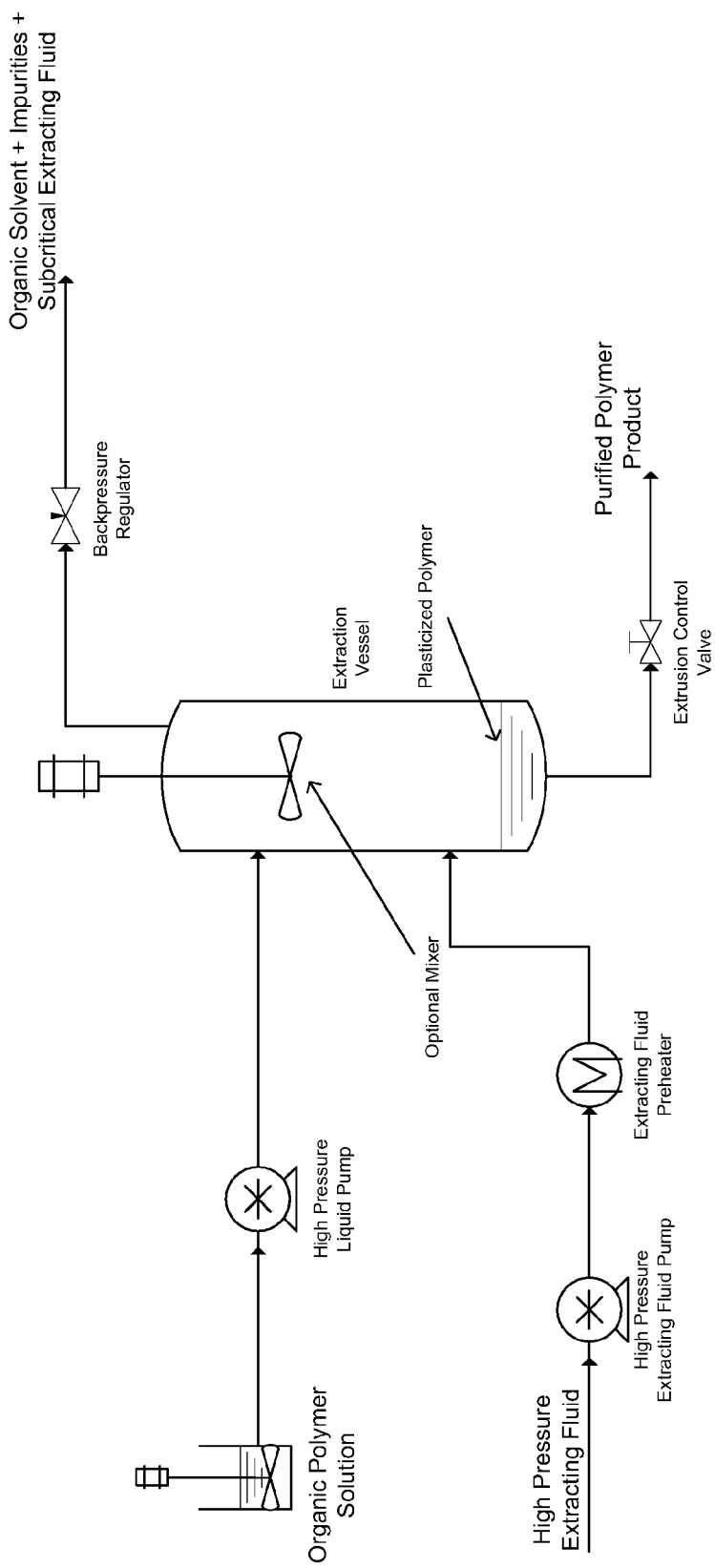
FIG. 3 is a schematic process flow diagram for a third embodiment of a method of the invention.

FIG. 3 is a schematic process flow diagram for a third embodiment of a method of the invention. In the third embodiment of the invention, a plasticized melt is produced in much the same manner as in the second embodiment of the invention. However, a counter-current flow arrangement is used, with the anti-solvent and polymer solution injected at opposite ends of the extraction vessel. The vent for anti-solvent containing the extracted solvent and impurities is on the top of the vessel. The polymer melt accumulates at the bottom of the extraction vessel (via gravity), where it is extruded from the bottom of the vessel in a continuous manner. An extrusion valve controls the rate of this extrusion.

Figure 4:
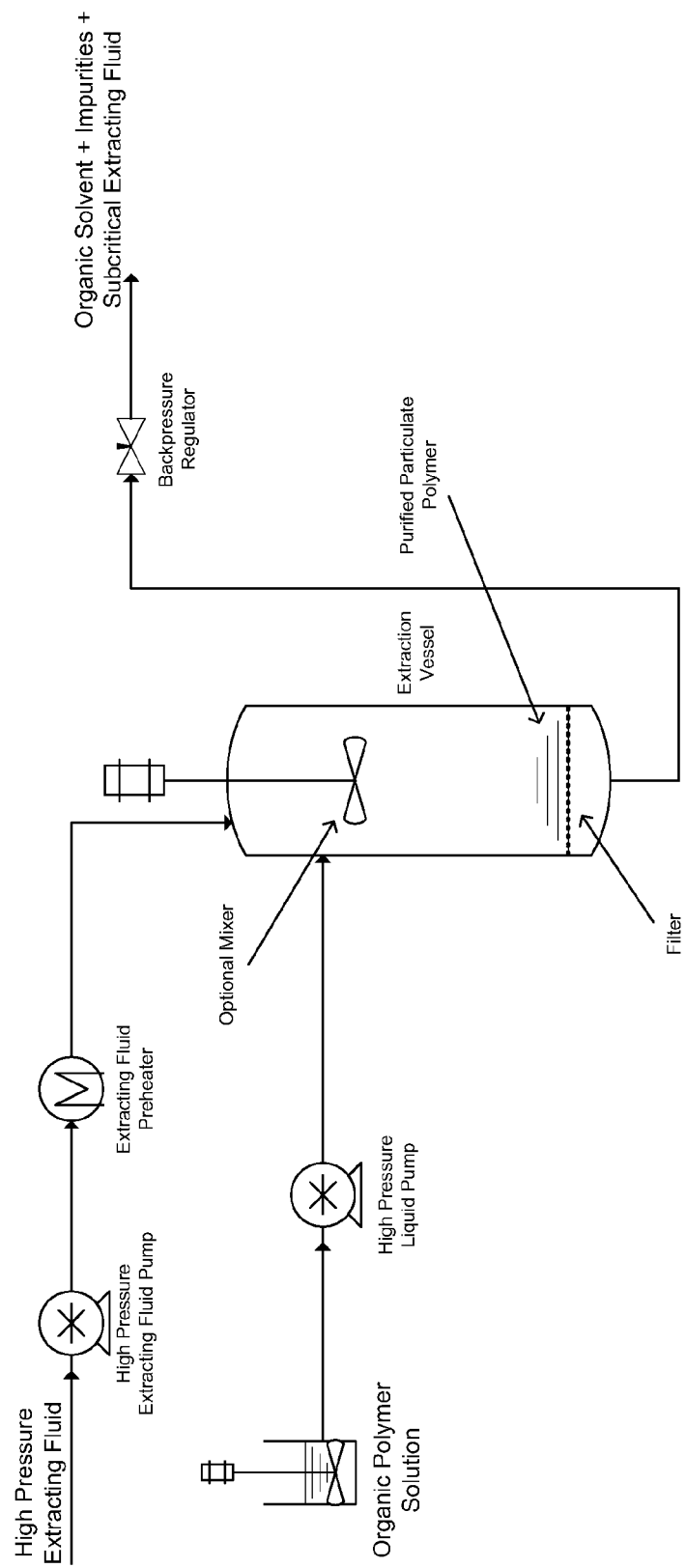
FIG. 4 is a schematic process flow diagram for a fourth embodiment of a method of the invention.

FIG. 4 is a schematic process flow diagram for a fourth embodiment of a method of the invention. In the fourth embodiment of the invention, solid polymer particles are precipitated (as described in the second embodiment of the invention). The purified polymer particles accumulate at the bottom of the extraction vessel on a filter. The anti-solvent and impurities flow through the filter and exit the vessel. The product is collected by depressurizing the system and opening the vessel. System pressure is controlled by means of a backpressure regulator on the vent line.

The present methods can be used to purify virtually any polymer because it is not essential that the polymer be plasticized by the extracting fluid (e.g., first and fourth embodiments of the invention). In all embodiments of the invention, all impurities, including residual solvents, are removed in one step. In addition, intense mechanical mixing is not required. A mechanical mixer is optional in all configurations. In fact, systems without any mixing devices are preferred. And, the methods of the invention are continuous processes (although they can be run as batch processes, if desired). Prior art purification processes have typically been batch processes only.

The following examples are intended to illustrate the invention without limiting it in any way.

EXAMPLE 1

10 parts by weight of poly(lactic-co-glycolic acid) ("PLGA") obtained from Lakeshore Biomaterials under the trade designation 5050DL 4A were dissolved in 90 parts by weight of dichloromethane ("DCM") to form an organic polymer solution. Separately, 3 parts by weight of polyvinyl alcohol ("PVA") were dissolved in 97 parts by weight of water to form an aqueous solution.

The organic polymer solution and the aqueous solution were co-introduced into a static mixing device. The flow rate of the organic polymer solution into the static mixing device was 1.0 ml/min, and the flow rate of the aqueous solution into the static mixing device was 4.0 ml/min. The organic polymer solution and the aqueous solution were homogenized in the static mixing device, forming an emulsion in which the organic polymer solution comprised the discontinuous internal phase and the aqueous solution comprised the continuous external phase.

A 5.0 ml/min. flow of the emulsion formed in the static mixing device was co-introduced with a 50 g/min. flow of SC $CO_2$ and mixed in a nozzle immediately prior to injection into an extraction column having a configuration as shown in FIG. 1. The temperature within the extraction column was maintained at 39° C., and the pressure was maintained at 85 bar, which was sufficient to maintain the SC $CO_2$ in a supercritical state.

In the extraction column, the organic solvent in the organic solution forming the internal phase of the emulsion was extracted into the supercritical fluid causing the PLGA to precipitate as substantially spherical solid particles into the aqueous continuous external phase of the emulsion. The aqueous suspension of PLGA particles and the organic solvent and SC $CO_2$ mixture were allowed to flow out of separate exits from the extraction column as shown in FIG. 1. The aqueous suspension of PLGA particles flowed into a separation vessel. The organic solvent and SC $CO_2$ mixture exited through the top of the separation vessel. The aqueous suspension of PLGA particles settled to the bottom of the separation vessel via gravity, where they were removed through a collection valve. Table 1 below shows the amount of residual monomer present in the PLGA before and after purification:

TABLE 1

| Monomer | Before | After | Standard Deviation |
|---|---|---|---|
| Glycolide | ~0.2% (wt) | Not Detectible | — |
| Lactide | ~0.9% (wt) | 0.0190% (wt) | 0.0001 |

EXAMPLE 2

5 parts by weight of PLGA obtained from Lakeshore Biomaterials under the trade designation 5050DL 4A were dissolved in 95 parts by weight of acetone to form an organic polymer solution.

A 1.0 ml/min. flow of the organic polymer solution was simultaneously, but separately, introduced into an extraction vessel such as shown in FIG. 2 together with a 50 g/min. flow of SC $CO_2$ by means of high-pressure pumps. The temperature within the extraction vessel was maintained at 75° C., and the pressure was maintained at 200 bar, which was sufficient to maintain the SC $CO_2$ in a supercritical state.

In the extraction vessel, the organic solvent in the organic solution dissolved into the SC $CO_2$ causing the PLGA to form a plasticized polymer melt, which flowed into an accumulation vessel connected to the bottom of the extraction vessel as shown in FIG. 2. The plasticized PLGA melt was extruded from the bottom of the accumulation vessel in a continuous manner while the SC $CO_2$ laden with acetone exited from the top of the extraction vessel through a backpressure regulator. Table 2 below shows the amount of residual monomer present in the PLGA before and after purification:

TABLE 2

| Monomer | Before | After | Standard Deviation |
|---|---|---|---|
| Glycolide | ~0.2% (wt) | Not Detectible | N/A |
| Lactide | ~0.9% (wt) | 0.0019% (wt) | 0.0001 |

Additional advantages and modifications will readily occur to those skilled in the art. Therefore, the invention in its broader aspects is not limited to the specific details shown and described herein. Accordingly, various modifications may be made without departing from the spirit or scope of the general inventive concept as defined by the appended claims and their equivalents.

What is claimed is:

1. A method of purifying a polymer containing impurities, the method comprising:

dissolving the polymer containing impurities in an organic solvent to form an organic polymer solution;

co-introducing the organic polymer solution and an aqueous solution into a homogenization device to form an emulsion, the emulsion having a discontinuous phase comprising the organic polymer solution and a continuous phase comprising the aqueous solution;

contacting the emulsion with an extraction fluid in an extraction column while the extraction fluid is maintained in a supercritical state to extract the organic solvent and impurities from the discontinuous phase and thereby precipitate purified solid polymer particles into the aqueous continuous phase to form an aqueous suspension of solid polymer particles; and separating the aqueous suspension of purified solid polymer particles from the extraction fluid, organic solvent and impurities.

2. The method according to claim 1 wherein the precipitated purified solid polymer particles are substantially spherical.

3. The method according to claim 1 wherein the polymer is selected from the group consisting of poly(lactic-co-glycolic) acid, polylactic acid, polyethylene glycol, Eudragit polymers, PMMA polymers, ethylcellulose, and combinations thereof.

4. The method according to claim 1 wherein the organic solvent is selected from the group consisting of halogenated hydrocarbons, ketones, alcohols, and ethyl acetate.

5. The method according to claim 1 wherein the extraction fluid is selected from the group consisting of supercritical carbon dioxide, supercritical ethane, supercritical ethylene, supercritical propane, supercritical propylene and supercritical pentane.

6. A method of purifying a polymer containing impurities, the method comprising:

dissolving the polymer containing impurities in an organic solvent to form an organic polymer solution;

simultaneously, but separately, co-introducing the organic polymer solution and an anti-solvent into an extraction vessel in concurrent flow streams while the anti-solvent is maintained in a supercritical state to extract the organic solvent and impurities from the organic solution and thereby form a plasticized polymer melt, the polymer being plasticized by the supercritical anti-solvent; and extruding the plasticized polymer melt from the extraction vessel into an accumulation vessel to separate the same from the anti-solvent containing the organic solvent and impurities.

7. The method according to claim 6 wherein the polymer is selected from the group consisting of poly(lactic-co-glycolic) acid, polylactic acid, polyethylene glycol, Eudragit polymers, PMMA polymers, ethylcellulose, and combinations thereof.

8. The method according to claim 6 wherein the organic solvent is selected from the group consisting of halogenated hydrocarbons, ketones, alcohols, and ethyl acetate.

9. The method according to claim 6 wherein the extraction fluid is selected from the group consisting of supercritical carbon dioxide, supercritical ethane, supercritical ethylene, supercritical propane, supercritical propylene and supercritical pentane.

10. A method of purifying a polymer containing impurities, the method comprising:

dissolving the polymer containing impurities in an organic solvent to form an organic polymer solution;

simultaneously, but separately, co-introducing the organic polymer solution and an anti-solvent into an extraction vessel in counter-current flow streams while the anti-solvent is maintained in a supercritical state to extract the organic solvent and impurities from the organic solution and thereby form a plasticized polymer melt, the polymer being plasticized by the supercritical anti-solvent;

venting the anti-solvent containing the organic solvent and impurities from the extraction vessel to allow the plasticized polymer melt to accumulate in the extraction vessel; and extruding the plasticized polymer melt from the extraction vessel.

11. The method according to claim 10 wherein the polymer is selected from the group consisting of poly(lactic-co-glycolic) acid, polylactic acid, polyethylene glycol, Eudragit polymers, PMMA polymers, ethylcellulose, and combinations thereof.

12. The method according to claim 10 wherein the organic solvent is selected from the group consisting of halogenated hydrocarbons, ketones, alcohols, and ethyl acetate.

13. The method according to claim 10 wherein the extraction fluid is selected from the group consisting of supercritical carbon dioxide, supercritical ethane, supercritical ethylene, supercritical propane, supercritical propylene and supercritical pentane.

14. A method of purifying a polymer containing impurities, the method comprising:

dissolving the polymer containing impurities in an organic solvent to form an organic polymer solution;

simultaneously, but separately, introducing the organic polymer solution and an anti-solvent into an extraction vessel while the anti-solvent is maintained in a supercritical state to extract the organic solvent and impurities from the organic solution and thereby precipitate the polymer in the form of solid particles;

collecting the solid particles of polymer on a filter in the extraction vessel as the anti-solvent, organic solvent and impurities are removed; and depressurizing the extraction chamber to recover the solid particles of purified polymer.

15. The method according to claim 14 wherein the polymer is selected from the group consisting of poly(lactic-co-glycolic) acid, polylactic acid, polyethylene glycol, Eudragit polymers, PMMA polymers, ethylcellulose, and combinations thereof.

16. The method according to claim 14 wherein the organic solvent is selected from the group consisting of halogenated hydrocarbons, ketones, alcohols, and ethyl acetate.

17. The method according to claim 14 wherein the extraction fluid is selected from the group consisting of supercritical carbon dioxide, supercritical ethane, supercritical ethylene, supercritical propane, supercritical propylene and supercritical pentane.

* * * * *